United States Patent
Klingler et al.

(10) Patent No.: US 6,844,022 B2
(45) Date of Patent: Jan. 18, 2005

(54) PROCESS FOR PRODUCING THEMOCHEMICALLY MODIFIED STARCH

(75) Inventors: Rudolf Klingler, Berlin (DE); Karl-Georg Busch, Kleinmachnow (DE)

(73) Assignee: Bayer CropScience GmbH, Frankfurt am Main (DE)

( * ) Notice: Subject to any disclaimer, the term of this patent is extended or adjusted under 35 U.S.C. 154(b) by 272 days.

(21) Appl. No.: 09/782,815

(22) Filed: Feb. 14, 2001

(65) Prior Publication Data

US 2001/0026827 A1 Oct. 4, 2001

(30) Foreign Application Priority Data

Feb. 16, 2000 (DE) .......................................... 100 07 061

(51) Int. Cl.$^7$ .......................... A23L 1/0522; C08B 31/00
(52) U.S. Cl. .......................... 426/661; 127/33; 127/39; 127/71
(58) Field of Search .......................... 127/32, 33, 38, 127/39, 67, 71; 426/508, 661, 626

(56) References Cited

U.S. PATENT DOCUMENTS

| 696,949 | A | * | 4/1902 | Duryea | 127/33 |
| 2,231,476 | A | * | 2/1941 | Meisel | 426/578 |
| 2,359,378 | A | * | 10/1944 | Morris | 127/38 |
| 2,894,859 | A | * | 7/1959 | Wimmer et al. | 127/33 |
| 3,073,724 | A | * | 1/1963 | Rankin et al. | 127/38 |
| 3,175,928 | A | * | 3/1965 | Lancaster et al. | 127/38 |
| 3,446,628 | A | * | 5/1969 | Schoch et al. | 426/578 |
| 3,479,220 | A | * | 11/1969 | Ferrara | 127/38 |
| 3,523,938 | A | | 8/1970 | Hershenson et al. | |
| 5,290,567 | A | * | 3/1994 | Schneider et al. | 424/489 |

FOREIGN PATENT DOCUMENTS

GB          2 112 621          *    7/1983

OTHER PUBLICATIONS

Whistler et al.; Starch: Chemistry & Technology, 1984, 2nd edition, pp. 230–237.*
Klinger et al, Säureabbau von Stärke unter semi–dry Bedingungen, Starch/Stärke, vol. 49, 1997, No. 10, pp. 391–395.

* cited by examiner

*Primary Examiner*—Keith Hendricks
(74) *Attorney, Agent, or Firm*—Frommer Lawrence & Haug LLP

(57) ABSTRACT

The present invention is in the technical field of physico-chemical starch modification and relates to a process for producing thermochemically modified starch, the thin-boiling starches which are obtainable by the inventive process and thermally reversible gel-forming dextrins, and to their use, in particular as gelatin substitute or fat substitute.

28 Claims, No Drawings

PROCESS FOR PRODUCING THEMOCHEMICALLY MODIFIED STARCH

The present invention is in the technical field of physicochemical starch modification and relates to a process for the thermochemical modification of starch, the acid-modified starches which are obtainable by the inventive process and have thin-boiling to thermally reversible gel-forming properties, and to their use.

Conventional starches obtained by acid modification, for example thin-boiling starches, are generally produced using what is termed a "slurry" process. In this process the aqueous suspension of a starch is stirred for a number of hours in the presence of mineral acid (for example HCl, $H_2SO_4$ or $H_3PO_4$) below its pasting temperature, then neutralized, washed, dewatered and finally dried (Whistler & Pashall: Starch: Chemistry and Technology Vol. II, Academic Press, New York and London, 1969, p. 219).

A starch modified in this manner, compared with the native comparison sample, shows a reduced thickening power on heating and an intensified gel-formation tendency after cooling. The modified property profile of this modified starch opens up numerous technical applications, inter alia in the food sector.

The use of acid-modified starch is gaining increasing importance in the food industry. Acid-modified starches are used especially to produce foods, in particular confectionery products, for example as substitutes for gelatin and gum arabic. However, there are also possible applications in industrial sectors, for example in yarn finishing in textile manufacture and in papermaking to improve abrasion resistance and printability.

In addition to the known "slurry" processes (see above), Klingler et al. have described a "semi-dry" process for producing acid-modified green-pea starch (Klingler et al., Starch/Stärke 1997, 49, 391–395), which not only produces thin-boiling starches, but also leads to a high-grade thermally reversible gel-forming dextrin product. Advantages of the process described compared with the slurry process are, for example, the lower chemical usage, a shorter reaction time, the reduction of byproducts and product losses and the avoidance of wastewaters and their disposal.

Disadvantages of the process described are the insufficient quantitative availability of green-pea starch, which is reflected in its economic efficiency, and in the limited spectrum of properties of the acid-modified green-pea starches.

The object of the present invention is therefore to provide by alternative means high-grade thermochemically modified starches which overcome the abovementioned disadvantages and conform to the various industrial requirements with respect to their properties.

Surprisingly, it has now been found that, by means of the inventive thermochemical process described in more detail in the claims, high-grade thin-boiling starches and, moreover, reversible gel-forming dextrins can be economically provided in sufficient quantity and a broad variability of properties of the obtainable products can be achieved. The inventive process therefore offers all of the abovementioned economic and ecological advantages of a semi-dry process.

By means of the present invention, to this extent, a surprisingly simple and economic alternative to the known production processes for thermochemically modified starch is provided, which can be used in a versatile manner.

Surprisingly, the inventive acid-modified thin-boiling starches and the thermally reversible gel-forming dextrins have a granular structure which leads to a very high dispersibility in contrast to commercially available reversible gel-forming dextrins.

The present invention therefore relates to a process for the thermochemical modification of starch, with the exception of green-pea starch, in which
  a) starch having a moisture content of a maximum of about 15–20%, preferably less than 10%, is heated in the presence of an acid at a rate of at least 3 K/min, especially 3–200 K/min, preferably about 4–200 K/min, in particular about 5–100 K/min, particularly preferably about 10–100 K/min, to a temperature no higher than about 50–120° C., preferably no higher than about 65–110° C., in particular no higher than about 80–100° C., and
  b) the pH is then neutralized, preferably set to a pH of about 5.5–7.5, in particular 6.0–6.5.

In a preferred embodiment, in the inventive process, before or during the neutralization, the temperature specified in process step a) is held for a period of up to 1 hour, preferably up to 30 minutes, and in particular up to 20 minutes.

In a further embodiment of the inventive process, after reaching the temperature specified in process step a), or after the neutralization, the starch is cooled at a rate of up to 10 K/min, preferably up to 5 K/min.

In a particular embodiment of the inventive process, the starch is heated at a rate of about 3–50 K/min, preferably 4–50 K/min to a temperature of about 60–120° C., preferably of about 90–120° C. and is then neutralized.

A further embodiment of the inventive process serves in particular to produce thin-boiling starch, in which, in process step a) of the inventive process, the starch is heated to a temperature which is between the pasting temperature and 15° C. above the pasting temperature of the starting starch.

A still further embodiment of the inventive process serves especially to produce thermally reversible gel-forming dextrins, in which, in process step a), the starch is heated to a temperature more than about 15–50° C., preferably more than about 15–30° C., in particular more than about 20–25° C., above the pasting temperature of the starting starch.

In a further preferred embodiment of the inventive process, thermally reversible gel-forming dextrins may be produced by choosing in step a) an acid concentration of about 40–100 mmol of acid/kg of starch, preferably about 50–80 mmol of acid/kg of starch and, if appropriate, heating the starch at a rate of about 15–100 K/min, preferably about 30–100 K/min.

The term "starting starch" here designates the starch which is subjected to the thermochemical treatment in the inventive process, with the exception of green-pea starch.

Suitable possible heating methods are, for example, using heating devices known to those skilled in the art, in which, in particular, heating of the starch to temperatues above 120° C. is to be avoided. Microwave ovens appropriately provided with a stirring apparatus have proved useful for this, but other heating devices known to those skilled in the art are also suitable. Alternatively, one or more of the reactants (starting starches, acid or alkali) can also be heated in a suitable manner before they are brought into contact with one another, so that if appropriate no heating power, or only a small amount of heating power, is required during the reaction. The process can proceed, in particular, in a continuous process so that technical problems during the heating of relatively large amounts of starch can be avoided. The possibilities of a continuous process procedure suitable for this are well known to those skilled in the art.

In the inventive process, in a further embodiment for accelerating the starch-hyrolysis reaction, the heating can be carried out with slight pressure range suitable for the inventive process is at the maximum up to 5 bar (500 kPa).

Optionally, the inventive process can be carried out in the presence of an alcohol, preferably methanol, ethanol, 1-propanol and/or 2-propanol, or in the presence of a suitable mixture of water and alcohol.

The starting starches used in the inventive process for producing thermochemically modified starch are preferably starches from starch-storing plants, in particular from the group consisting of corn, wheat, tapioca, mung bean and potato. In addition to the customarily available starches from naturally existing plants, recently, starches from plants are increasingly becoming available which have been produced by mutant selection or by genetic engineering methods and which may have been modified, for example, with respect to their quantitative or qualitative starch content (gentically modified starches). In particular, owing to these processes, starches are available from corn, potato and wheat which, for example, are increased in their amylose content and/or, with respect to their degree of phosphorylation, have markedly modified properties. Starches of this type are explicitly suitable as starting starches in the inventive process.

By way of example, genetically modified starches are disclosed by the patent literature mentioned below, with the publications mentioned representing an arbitrary enumeration, and not representing a preferred or complete selection:

WO 90/12876A1, WO 91/19806A1, WO 92/11375A1, WO 92/11376A1,

WO 92/11382A1, WO 92/14827A1, WO 94/09144A1, WO 94/11520A1,

WO 95/04826A1, WO 95/07355A1, WO 95/26407A1, WO 95/34660A1,

WO 95/35026A1, WO 96/15248A1, WO 96/19581A1, WO 96/27674A1,

WO 96/34968A1, WO 97/04112A1, WO 97/04113A1, WO 97/11188A1,

WO 97/16554A1, WO 97/20040A1, WO 97/22703A1, WO 97/45545A1,

WO 98/11181A1, WO 98/15621A1, WO 98/37213A1, WO 98/37214A1, and CA 2,061,443, DE 19820607.0, DE 19820608.9, DE 19836097.5, DE 19836098.3, DE 19836099.1, EP-A-0 521 621, EP-A-0 703 314, EP-A-0 737 777, EP-A-0 779 363 or U.S. Pat. No. 5,300,145.

It is particularly surprising that, using the inventive process, outstanding products, that is to say thermochemically modified starches, are also obtained if starting starches having an amylose content less than 30% (w/w) are used. However, in addition, starches having an amylose content greater than 40% (w/w) are a further preferred selection range of suitable starting starches which lead to products of very high quality grade.

The acids used in the inventive process for producing thermochemically modified starch are generally organic or inorganic acids, preferably mineral acids, for example HCl, $H_2SO_4$, $HNO_3$ or $H_3PO_4$. The use of acids having a somewhat weaker $pK_a$ of up to 2.5 is also highly suitable, however.

The starch in the inventive process is generally thermochemically treated directly or indirectly, so that a mild hydrolysis of the glycosidic bonds in the starch molecules is allowed. In the simplest case, this is made possible by spraying a dilute solution of the acid uniformly onto the starch. If appropriate, the acid can also be brought into contact in the gaseous state with the starch; it is especially important that a uniform and mild hydrolysis is carried out and excessive local acid concentration is avoided, since this would otherwise impair the product quality.

To ensure mild hydrolysis conditions, the acid should therefore generally not be too highly concentrated. The acid should be used, or brought into contact with the starch, for example as dilute solution at a concentration of about 0.05–5 M, preferably about 0.1–3 M. The starch in this case can preferably be mechanically agitated (stirred, shaken, circulated, etc.), in order to avoid local overconcentration of the acid. The acid can be brought into contact with the starch if appropriate warm, hot, close to boiling point or, if appropriate, in the gaseous state, in order to promote the process and/or product properties, in order to shorten the reaction time, for example.

Generally, the quantitative ratio of acid to starch in the inventive process is about 1–100 mmol of acid/kg of starch, preferably about 5–75 mmol/kg, in particular about 10–60 mmol/kg.

To complete the reaction, that is to say the acid hydrolysis, in step b) of the inventive process neutralization is carried out using a suitable alkali, if appropriate with cooling, with basic substances suitable for applications in the food sector being preferred. For example, in addition to dilute solutions of NaOH, especially soda solutions in the range of about 0.01–5 M, preferably about 0.05–2 M can be used in the food sector. During the neutralization or after neutralization, the reaction mixture is cooled to a temperature between about 0 and 35° C.

If wanted, the product obtained from the inventive process, that is to say the thermochemically modified starch, can be dried after neutralization, for example by pneumatic drying or fluidized bed drying, or by other suitable drying methods known to those skilled in the art.

Further subject-matter of the invention is also thermochemically modified starches obtainable by the inventive process, in particular those which have a granular structure, and very particularly themochemically modified corn starch, wheat starch, tapioca starch, mung bean starch and/or potato starch, particularly having a granular structure. Thin-boiling starches, dextrins having a pronounced gel-formation property and thermally reversible gel-forming dextrins which are obtainable by the inventive process are preferred in particular. In a further preferred embodiment, the inventive thermochemically modified starches have a granular structure.

Further subject-matter of the invention is also the use of starch, with the exception of green-pea starch, in the inventive process for producing thermochemically modified starch, in particular the use of corn starch, wheat starch, tapioca starch, mung bean starch and/or potato starch, especially for producing dextrins of granular structure.

The thermally reversible gel-forming dextrins obtainable from the inventive process are, owing to their special property of the thermally reversible sol-gel transition, outstandingly suitable in certain foods or food compositions (mayonnaises, dressings, ice cream, etc.), e.g. as fat substitutes.

Still further subject matter of the invention is the use of the ivnentive thermochemically modified starch for producing foods, food compositions or food intermediate products and the use of the inventive thermochemically modified starch as substitute for fat (for example in foods such as margarine, mayonnaise, dressings, ice cream, peanut butter, coffee whitener, etc.) or as substitute for gelatin, for example in the pharmaceutical sector (gelatin capsules, etc.), or in the food sector for meat products (aspic, jus, etc.), for confectionery products (fruit gum, licorice, etc.) or for thickening and binding delicatessen and dairy products (jelly, milk puddings, crèmes). The inventive thermally reversible gel-forming dextrins, in addition to their primary gel-formation properties, have a flavor binding capacity, dispersibility and/or acid stability which is outstanding for these purposes.

A further embodiment of the present invention is therefore the use of the thermally reversible gel-forming dextrins obtainable from the inventive process as fat substitute, preferably in food, food compositions or food intermediate products.

The inventive thermochemically modified starches based on potato starch have a very particular taste-neutral behavior, so that their use is particularly preferred for the above-described fields of application in foods.

Furthermore, therefore, subject-matter of the invention is a food intermediate product, food or a food composition comprising an inventive thermochemically modified starch, in particular a fat substitute or gelatin substitute, comprising an inventive thermochemically modified starch, particularly a thermochemically modified potato starch.

Unless stated otherwise, all percentages associated with the present invention are percentages by weight (% w/w).

The starches or starch samples which are listed below in the following examples and are labeled with a letter have the following meanings:

A=native starch from potatoes of cultivar Désireé (wild type)
B=starch from genetically modified potatoes, for example obtainable according to Example 10 of WO 97/11188
C=starch from genetically modified potatoes, for example obtainable according to Example 7 of WO 97/11188
D=corn starch, Cerestar, Krefeld, Germany
E=wheat starch, Crespel & Deiters, Ibenbüren, Germany
F=tapioca starch, Thai World Import & Export Co., Ltd
G=amylomaize starch, Hylon V, Nat. Starch & Chemical GmbH, Neustadt, Germany
H=mung bean starch, SitThi Nam Co, Ltd. Sathorn Thani, Bangkok, Thailand
K=potato starch, Emsland Stärke GmbH, Emlichheim, Germany.

The examples below are intended to illustrate the invention and in no way represent a restriction of the invention.

EXAMPLE 1
Production of Thin-boiling Starch

To produce thin-boiling starch, about 150 g of the different starch samples described in more detail below were sprayed with 3–9 ml of 1 M HCl, that is to say 20–60 mmol/kg of starch, with constant mixing, and were heated in a microwave oven at about 250 W nominal power with stirring to 60–95° C. in the course of about 1–2 minutes. The samples were then neutralized with 2–10 ml of a 1 M soda solution and cooled.

EXAMPLE 2
Viscometric Characterization of Acid-modified Starches

The acid-modified starches produced according to Example 1 were studied by viscometry using a Micro-Amylo viscograph (Brabender oHG, Duisburg, Germany). A commercially conventional product, Perfectagel MPT (Ref. No. 34384/02) from Avebe (Veendam, The Netherlands) served as comparison product.

The Brabender viscosities were determined as follows: 100 g of an 8.5% strength starch suspension were heated with constant stirring at a rate of 3 K/min to 90° C. (Table 1A) or the temperature specified, then the temperature was kept constant at 90° C. for 15 minutes, then the samples were cooled at 3 K/Min to 30° C. and then the change in torque (measurement range 250 cmg) was measured (see Table 1). The viscosities are reported in Brabender units, abbreviated [BU].

TABLE 1A

Viscosity data of various starch samples

| | Peak viscosity | Hot paste viscosity[1] | Cold viscosity[2] |
|---|---|---|---|
| Perfectagel MPT | 130 BU ± 10 | 20 BU ± 5 | 100 BU ± 5 |
| Acid-modified starch C (32% amylose) | 195 BU ± 10 | 50 BU ± 5 | 510 BU ± 10 |
| Starch K, native | 2110 BU ± 15 | 500 BU ± 10 | 1400 BU ± 10 |
| Acid-modified starch K | 300 BU ± 10 | 50 BU ± 5 | 340 BU ± 10 |

[1] 15 min at 90° C.;
[2] 30° C.

TABLE 1B

Effect of modification temperture on viscosity

| | Starch B | Heating at | | | Starch K | Heating at | | |
|---|---|---|---|---|---|---|---|---|
| | Native [BU] | 61° C. [BU] | 71° C. [BU] | 80° C. [BU] | Native [BU] | 62° C. [BU] | 69° C. [BU] | 73° C. [BU] |
| Peak viscosity | 664 | 425 | 332 | 197 | 1871 | 1388 | 1088 | 928 |
| Hot paste -[1] | 478 | 267 | 224 | 125 | 454 | 301 | 259 | 209 |
| Cold viscosity[2] | 1377 | 751 | 603 | 317 | 1304 | 841 | 723 | 632 |

[1] 15 min at 90° C.;
[2] 30° C.

EXAMPLE 3
Production of Gel-forming Dextrins

The individual starch samples listed in Table 2 (below) were dried to about 8–9% moisture content 100 g of the starch were sprayed in each case with 1–3.75 ml of a 2 M HCl solution (20–75 mmol of acid/kg of starch) and heated in a rotating round-bottomed flask (250 ml) for 5–20 minutes in an oil bath from room temperature (about 23° C.) to a temperature of 90–105° C., and then either immediately, or after the hot-holding time mentioned below, neutralized with 1 M soda solution and cooled. For the subsequent characterization of the dextrins, 20% strength boilings at 90° C. (Haake Rotovisko RV 12 from Haake, Karlsruhe, Germany) or at 120° C. (autoclave type KL 51 from Wolf) were charged into cylindrical vessels of two rings one above the other (each 20 mm high, diameter 25 mm), stored for one day at room temperature (23±2° C.) and then the gel firmness was measured. The gel firmness was measured after about 24 hours of storage at room temperature using a texture analyzer (TA.XT2 Stable Micro Systems, Haslemere Surrey GU27 3AY, Great Britain) by single compression of the gel using a flat-ended cylinder probe (diameter 24.5 mm). A planar gel surface was obtained by slicing through the solidified gel between the two rings. The thermal reversibility of gel formation was tested by melting, and the appearance (color, glossiness), consistency (paste-like) and homogeneity and taste were assessed.

Tables 2 A–D show the dextrin properties with respect to gel firmness, thermal reversibility of gel formation and also their optical appearance.

Gel firmness values in a range of about 5±3 N indicate a gel firmness generally suitable for a fat substitute. Highly suitable fat substitutes are distinguished, furthermore, by a color as white as possible, a glossy surface, a homogeneous fatty consistency and a thermally reversible gel formation.

TABLE 2

Effect of differing process parameters on dextrin properties
Table 2A: 20 mmol HCl/kg of starch

| Starch sample | | T [° C.] | 95 | | | 100 | | | 105 |
|---|---|---|---|---|---|---|---|---|---|
| | Holding time [min] | | 0 | 5 | 10 | 0 | 5 | 10 | 0 |
| D | Gel firmness [N] | | 7.7 | 5.2 | 6.5 | 4.1 thermally rev | 6.2 thermally rev | 0.8 thermally rev | |
| | Optical properties | | whiteish yellow | whiteish yellow | whiteish yellow | whiteish yellow | whiteish yellow | whiteish yellow | |
| E | Gel firmness [N] | | n.m. | 5.5 | 4.8 | n.m. too solid | 0.5 thermally rev | 0.4 thermally rev | |
| | Optical properties | | white transparent | white-transparent matt | white-transparent matt | | white-transparent glossy | white-transparent glossy | |
| B | Gel firmness [N] | | | | | n.m. too solid | n.m. too solid | 28.5 | 28.3 |
| | Optical properties | | | | | | | white transparent | gray |

TABLE 2B 30 mmol HCl/kg of starch

| Starch sample | | T [° C.] | 95 | | | 100 | | |
|---|---|---|---|---|---|---|---|---|
| | Holding time [min] | | 0 | 5 | 10 | 0 | 5 | 10 |
| D | Gel firmness [N] | | 1.3 thermally rev | 1.9 thermally rev | n.m. too thin | 0.2 thermally rev | n.m. too thin | n.m. too thin |
| | Optical properties | | whiteish-yellow | whiteish-yellow | | whiteish-yellow | | |
| E | Gel firmness [N] | | 1.0 thermally rev | n.m. too thin | n.m. too thin | 0.7 thermally rev | 0.4 thermally rev | 0.4 thermally rev |
| | Optical properties | | white-transparent glossy | | | white transparent | white glossy | white glossy |
| F | Gel firmness [N] | | | | | 3.9 thermally rev | 1.2 thermally rev | n.m. too thin |
| | Optical properties | | | | | whiteish-brown transparent | whiteish-brown transparent | |

TABLE 2C 40 mmol HCl/kg of starch

| Starch sample | | T [° C.] | 95 | | | 100 | | | 105 | | |
|---|---|---|---|---|---|---|---|---|---|---|---|
| | Holding time [min] | | 0 | 5 | 10 | 0 | 5 | 10 | 0 | 5 | 10 |
| A | Gel firmness [N] | | 27 thermally rev | 9 thermally rev | 5 thermally rev | 9.2 thermally rev | n.m. too thin | n.m. too thin | | | |
| | Optical properties | | white glossy | white glossy | white glossy | white glossy | | | | | |
| B | Gel firmness [N] | | | | | 1.75 thermally rev | 24.2 thermally rev | 6.2 thermally rev | 1.6 thermally rev | 17.4 thermally rev | 8.4 thermally rev |
| | Optical properties | | | | | white | gray | white | white | gray | white |

TABLE 2C-continued

| | | 40 mmol HCl/kg of starch | | | | | | | | |
|---|---|---|---|---|---|---|---|---|---|---|
| | T [° C.] | 95 | | | 100 | | | 105 | | |
| Starch sample | Holding time [min] | 0 | 5 | 10 | 0 | 5 | 10 | 0 | 5 | 10 |
| D | Gel firmness [N] | | | glossy | | 0.4 | glossy n.m. too thin | glossy n.m. too thin | | glossy |
| | Optical properties | | | | | whiteish-yellow | | | | |
| G | Gel firmness [N] | | | | | 2.5 thermally rev | 0.9 thermally rev | n.m. too thin | | |
| | Optical properties | | | | | whiteish-yellow glossy | whiteish-yellow glossy | | | |
| E | Gel firmness [N] | | | | | 0.5 thermally rev | 0.6 thermally rev | n.m. too thin | | |
| | Optical properites | | | | | white-transparent glossy | white-transparent glossy | | | |
| H | Gel firmness [N] | | | | | 9.1 thermally rev | 1.0 thermally rev | n.m. too thin | | |
| | Optical properites | | | | | whiteish-gray matt | whiteish-gray matt | | | |

TABLE 2D

| | | 60 mmol HCl/kg of starch | | |
|---|---|---|---|---|
| Starch | T[° C.] | | 100 | |
| sample | Holding time [min] | 0 | 5 | 10 |
| B | Gel firmness [N] | 11.1 thermally rev | 1.15 thermally rev | n.m. too thin |
| | Optical properties | light transparent | white glossy | |

Key to Tables 2 A–D:
n.m.=not measurable (too firm or too soft) thermally rev=thermally reversible gel formation.

EXAMPLE 3B
Effect of Heating Rate on Dextrin Properties

According to the description of example 3 commercially available potato starch (starch sample K) was heated with different rates from room temperature (about 23° C.) to T=95° C. (without holding time).

TABLE 2E

Effect of heating rate on dextrin properties

| Heating time [min] | Gel strength [N] | Gel properties |
|---|---|---|
| 15 | 8.3 ± 0.5 | pasty gel, white, thermally reversible |
| 120 | 39.9 ± 0.1 | solid gel, greyish, irreversible |
| 150 | 32.0 ± 0.5 | solid gel, greyish, irreversible |
| 165 | 5.6 ± 0.1 | not pasty, greyish, inhomogen |
| 180 | n.m. | no gel, liquid, white |
| 360 | n.m. | kein Gel, flüssig, transparent |

EXAMPLE 4
Dispersibility of Various Dextrins

The dextrins produced inventively according to Example 3 (with 40 mmol of HCl at T=105° C., a holding time of 5 minutes and a heating rate of 8 K/min) were studied with respect to their dispersibility and temperature stability and compared with a commercially available trade product from Avebe (Paselli™-SA 2).

To determine the dispersibility, in each case 2 g of the starch samples were stirred into 100 ml of cold water (25° C.). The dispersion, after 1 min, was poured through a 100 μm sieve and the solid content determined in the material passed through (Table 3).

TABLE 3

Dispersibility of the dextrins

| | Paselli ™-SA 2 | Starch sample B | Starch sample K |
|---|---|---|---|
| Dispersibility | 63% | 98% | 98% |

EXAMPLE 5
Temperature Stability of the Dextrins

Table 4 below shows the gel firmness of the inventively produced dextrins (according to Example 3 with T=105° C., 5 minutes holding time, heating rate 8 K/min) as a function of the solids content in comparison with a commercially available fat substitute (Paselli™-SA 2 from Avebe).

TABLE 4

Temperature stability of the dextrins

| | Gel firmness [N] | | | | | |
|---|---|---|---|---|---|---|
| | Paselli ™-SA 2 | | Starch sample B | | Starch sample K | |
| Dry matter [%] | 90° C. | 120° C. | 90° C. | 120° C. | 90° C. | 120° C. |
| 20 | 4.3 | 1.3 | 2.7 | 2.8 | 2.6 | 0.6 |
| 25 | 11.3 | 7.4 | 7.6 | 13.4 | 8.6 | 1.7 |
| 30 | 17.4 | 14.1 | 9.0 | 26.5 | 13.4 | 6.1 |

Table 4 shows a considerably improved thermal stability of the inventive dextrins produced from starch sample B, heated to 120° C.

EXAMPLE 6
Acid Stability of the Gel-formation Properties of Dextrins

Table 5 below shows the gel firmness of the inventive dextrins (produced according to Example 3 with T=105° C. and 5 minutes holding time, heating rate 8 K/min) as a function of the pH at a solids content of 20% after heating to 90° C. compared with a commercially available fat substituted (Paselli™-SA 2 from Avebe).

TABLE 5 pH dependence of gel formation of dextrins

| | Gel firmness [N] | | | | | |
|---|---|---|---|---|---|---|
| pH | Paselli ™-SA 2 | | Starch sample B | | Starch sample K | |
| 2.9 | 2.3 | 50% | 7.5 | 82% | 3.2 | 76% |
| 4.0 | 2.9 | 63% | 9.0 | 98% | 3.3 | 79% |
| 5.0 | 3.3 | 72% | 9.1 | 99% | 4.1 | 98% |
| 6.0 | 4.6 | 100% | 9.2 | 100% | 4.2 | 100% |

Table 5 shows a markedly improved acid stability of the inventive dextrins produced from starch sample B.

What is claimed is:

1. A process for the thermochemical modification of starch, with the exception of green-pea starch, comprising the steps of contacting a starch, having an amylose content greater than 40% (w/w), and a moisture content of less than about 20%, with an acid, heating the mixture at a rate of at least 3 K/min to a temperature of about 50–120° C., and then, if necessary, neutralizing the pH of the mixture to about 5.5–7.5 by adding a base.

2. The process of claim 1 wherein the starch is corn starch, wheat starch, tapioca starch, mung-bean starch, or potato starch.

3. The process of claim 1 wherein the starch is corn starch, wheat starch, or potato starch.

4. The process of claim 1 wherein the starch is from a genetically modified plant.

5. The process of claim 1 further comprising the step of maintaining the mixture at a temperature of about 50–120° C. for about 5–60 minutes.

6. The process of claim 1 further comprising the step of cooling the mixture to about 0–35° C. before the neutralizing step.

7. The process of claim 1 further comprising the step of cooling the mixture to about 0–35° C. during the neutralizing step.

8. The process of claim 1 wherein the temperature of the mixture is raised at a rate of 3–50 K/min.

9. The process of claim 1 wherein the temperature of the mixture is raised to a temperature in the range of about the pasting temperature of the starch to about 15° C. above the pasting temperature of the starch.

10. The process of claim 1 wherein the temperature of the mixture is raised to a temperature in the range of about 15° C. above the pasting temperature of the starch to about 50° C. above the pasting temperature of the starch.

11. A thermochemically modified starch obtained by the process of claim 1.

12. The thermochemically modified starch of claim 11 which is granular.

13. A food comprising the thermochemically modified starch obtained by a process for the thermochemical modification of starch, with the exception of green-pea starch, comprising the steps of contacting a starch having moisture content of less than about 20% with an acid, heating the mixture at a rate of at least 3 K/min to a temperature of about 50–120° C. and then, if necessary, neutralizing the pH of the mixture to about 5.5–7.5 by adding a base.

14. A food intermediate product comprising the thermochemically modified starch obtained by a process for the thermochemical modification of starch, with the exception of green-pea starch, comprising the steps of contacting a starch having moisture content of less than about 20% with an acid, heating the mixture at a rate of at least 3 K/min to a temperature of about 50–120° C., and then, if necessary, neutralizing the pH of the mixture to about 5.5–7.5 by adding a base.

15. A food composition comprising the thermochemically modified starch obtained by a process for the thermochemical modification of starch, with the exception of green-pea starch, comprising the steps of contacting a starch having moisture content of less than about 20% with an acid, heating the mixture at a rate of at least 3 K/min to a temperature of about 50–120° C., and then, if necessary, neutralizing the pH of the mixture to about 5.5–7.5 by adding a base.

16. A gelatin substitute comprising the thermochemically modified starch obtained by a process for the thermochemical modification of starch, with the exception of green-pea starch, comprising the steps of contacting a starch having moisture content of less than about 20% with an acid, heating the mixture at a rate of at least 3 K/min to a temperature of about 50–120° C., and then, if necessary, neutralizing the pH of the mixture to about 5.5–7.5 by adding a base.

17. A food comprising the gelatin substitute of claim 16.

18. A food intermediate product comprising the gelatin substitute of claim 16.

19. A food composition comprising the gelatin substitute of claim 16.

20. A fat substitute comprising the thermochemically modified starch obtained by a process for the thermochemical modification of starch, with he exception of green-pea starch, comprising the steps of contacting a starch having moisture content of less than about 20% with an acid, heating the mixture at a rate of at least 3 K/min to a temperature of about 50–120° C., and then, if necessary, neutralizing the pH of the mixture to about 5.5–7.5 by adding a base.

21. A food comprising the fat substitute of claim 20.

22. A food intermediate product comprising the fat substitute of claim 20.

23. A food composition comprising the fat substitute of claim 20.

24. A thermochemically modified starch obtained by the process of claim 3.

25. A thermochemically modified starch obtained by the process of claim 4.

26. The process of claim 1 wherein the starch has maximum moisture content of about 15%.

27. The process of claim 1 wherein the starch has a moisture content of less than 10%.

28. The process of claim 1 wherein the starch is a potato starch having an amylose content of greater than 40% (w/w).

* * * * *